(12) United States Patent
Hirai et al.

(10) Patent No.: US 8,577,603 B2
(45) Date of Patent: Nov. 5, 2013

(54) NAVIGATION DEVICE

(75) Inventors: Masato Hirai, Tokyo (JP); Yoko Sano, Tokyo (JP); Tsuyoshi Sempuku, Tokyo (JP); Makoto Otsuru, Tokyo (JP); Kotoyu Sasayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/699,482

(22) PCT Filed: May 23, 2011

(86) PCT No.: PCT/JP2011/002864
§ 371 (c)(1),
(2), (4) Date: Nov. 21, 2012

(87) PCT Pub. No.: WO2011/148612
PCT Pub. Date: Dec. 1, 2011

(65) Prior Publication Data
US 2013/0073197 A1    Mar. 21, 2013

(30) Foreign Application Priority Data
May 24, 2010  (JP) .................................. 2010-118429

(51) Int. Cl.
*G01C 21/00* (2006.01)
(52) U.S. Cl.
USPC .......................................................... 701/438
(58) Field of Classification Search
USPC ......... 701/201, 211, 410, 411, 440, 467, 431, 701/438, 426, 418, 428
See application file for complete search history.

(56) References Cited

U.S. PATENT DOCUMENTS

| | | | |
|---|---|---|---|
| 8,339,399 B2* | 12/2012 | Snow | 345/440 |
| 2001/0037177 A1* | 11/2001 | Nishida et al. | 701/211 |
| 2003/0201914 A1 | 10/2003 | Fujiwara et al. | |
| 2004/0012506 A1 | 1/2004 | Fujiwara et al. | |
| 2008/0262717 A1* | 10/2008 | Ettinger | 701/206 |
| 2009/0100363 A1* | 4/2009 | Pegg et al. | 715/765 |
| 2011/0010650 A1* | 1/2011 | Hess et al. | 715/765 |

FOREIGN PATENT DOCUMENTS

| | | |
|---|---|---|
| JP | 7-244719 A | 9/1995 |
| JP | 10-89976 A | 4/1998 |
| JP | 10-333562 A | 12/1998 |
| JP | 2002-23620 A | 1/2002 |
| JP | 2005-10091 A | 1/2005 |
| JP | 2006-267122 A | 10/2006 |
| JP | 2008-267955 A | 11/2008 |
| JP | 2009-36712 A | 2/2009 |
| WO | WO 2009/031203 A1 | 3/2009 |

* cited by examiner

*Primary Examiner* — Mary Cheung
*Assistant Examiner* — Rodney Butler
(74) *Attorney, Agent, or Firm* — Birch, Stewart, Kolasch & Birch, LLP

(57) ABSTRACT

Disclosed is a navigation device including a guidance route calculation unit 3 for calculating a guidance route by using point information about a destination, point information about a current position, and map information, a guidance map generating unit 5 for generating a guidance route map by using the calculated guidance route and the map information, a guidance route surrounding facility icon arrangement unit 6 for extracting a facility icon required for the calculated guidance route according to a facility icon extraction rule, and for determining an offset arrangement position of this facility icon, and a display unit 11 for attaching the facility icon at the above-mentioned determined offset arrangement position on the above-mentioned guidance route map to display the facility icon.

10 Claims, 10 Drawing Sheets

(a)

| Inter-Type Priority | Type |
|---|---|
| 20 (High) | Gas Station |
| 19 | Bank |
| 18 | Family Restaurant |
| 17 | Convenience Store |
| 16 | Fast Food |
| . | . |
| 1(Low) | . |
| No Value | ... |

(b)

| Intra-Type Priority | Type |
|---|---|
| 10(High) | ○○ Gas Station |
| 9 | □□ Oil |
| 8 | △△ Company |
| 7 | . |
| 6 | . |
| . | . |
| 1(Low) | . |
| No Value | ... |

| Arrangement Result | Evaluation |
|---|---|
| Facility Icon Overlaps Guidance Route | Rearrangement Is Necessary |
| Facility Icon Does Not Overlap Guidance Route | Rearrangement Is Unnecessary |
| Facility Icons Overlap Each Other | Rearrangement Is Necessary |
| Facility Icons Do Not Overlap Each Other | Rearrangement Is Unnecessary |

# NAVIGATION DEVICE

FIELD OF THE INVENTION

The present invention relates to a navigation device which modifies the arrangement positions of facility icons on a map, thereby improving the visibility of a guidance route.

BACKGROUND OF THE INVENTION

In such a type of navigation, various objects (pieces of information) are arranged on a map. Particularly in the case of facility icons, a huge number of icons are displayed on a map, and there are cases in which facility icons overlap each other, and facility icons cover a guidance route. Accordingly, there may be case in which information important during travel, particularly a guidance route including an intersection where the user should make a right or left turn is covered by a facility icon, the guidance route being one of the most important guidance routes provided for the user.

For example, a conventional technique disclosed by patent reference 1 relates to a guidance device based on building shape maps, for providing guidance on roads by displaying a building shape map in which house shapes and roads are drawn. The guidance device searches for landmark information about landmarks located around a specific point, and displays the landmarks on a building shape map.

The guidance device also sets a region extending from the current position in the traveling direction according to the vehicle speed, searches for landmark information about landmarks located within a region with a predetermined angle and at a distance from the current position in the traveling direction, and landmark information about landmarks located around an intersection for guidance, and displays the pieces of landmark information as landmarks.

According to a conventional technique disclosed by patent reference 2, objects associated with real estate are arranged in descending order of priority in such a way as not to overlap each other. A balloon display is used (leading lines, such as arrows, can be used) in order to establish associations between real estate icons and objects.

RELATED ART DOCUMENT

Patent Reference

Patent reference 1: Japanese Unexamined Patent Application Publication No. 10-333562
Patent reference 2: Japanese Unexamined Patent Application Publication No. 2002-023620

Problems to be Solved by the Invention

However, because unnecessary facility icons are also displayed uniformly on a guidance route when producing a map display in a conventional navigation device, such unnecessary facility icons cause the entire screen to become complicated, and result in a factor to a remarkable reduction in the visibility of the screen. Particularly in the case of displaying a map having many facility icons like a map of the center of a city, because the facility icons cover the screen and hence the guidance route is hard to see, the usability of the navigation device gets worse.

According to patent reference 1, landmark information about landmarks located around a specific point is searched for, and landmarks are displayed on a building shape map. Although because landmark icons are displayed on a building shape map, the positions of landmark icons on the map are accurate, there can be a case in which adjacent landmark icons overlap each other and landmark icons cover the guidance route depending upon a map scale.

According to patent reference 2, information objects associated with real estate are arranged in descending order of priority in such a way as not to overlap each other. Further, a balloon display is used in order to establish associations between real estate icons and information objects. However, there can be a case in which adjacent real estate icons overlap each other.

The present invention is made in order to solve the above-mentioned problems, and it is therefore an object of the present invention to provide a navigation device which displays an easy-to-understand guidance route having improved instantaneous visibility and improved cognition by extracting only the icons of facilities which are located around the guidance route and which are used as landmarks, and controlling the positions of the facility icons dynamically in such a way that facility icons do not overlap each other and no facility icon overlaps the guidance route, and by displaying the facility icons in a large size to give them prominence, and highlighting facility icons important for driving and the guidance route.

SUMMARY OF THE INVENTION

In accordance with the present invention, there is provided a navigation device including: a guidance route calculation unit for calculating a guidance route by using point information about a destination, point information about a current position, and map information; a guidance map generating unit for generating a guidance route map by using the calculated guidance route and the map information; a guidance route surrounding facility icon arrangement unit for extracting a facility icon required for the calculated guidance route according to a facility icon extraction rule, and for determining an offset arrangement position of this facility icon; and a display unit for attaching the facility icon at the above-mentioned determined offset arrangement position on the above-mentioned guidance route map to display the facility icon.

Because the navigation device according to the present invention controls the positions of facility icons dynamically in such a way that the facility icons do not overlap each other or no facility icon overlaps the guidance route, there is provided an advantage of being able to provide a high-instantaneous-visibility intelligible guidance route map.

BRIEF DESCRIPTION OF THE FIGURES

FIG. 16 is a view showing a database which stores criteria by each of which to determine whether a facility icon overlaps a guidance route.

EMBODIMENTS OF THE INVENTION

Hereafter, the preferred embodiments of the present invention will be described in detail with reference to the accompanying drawings.

Embodiment 1

Figure 1:
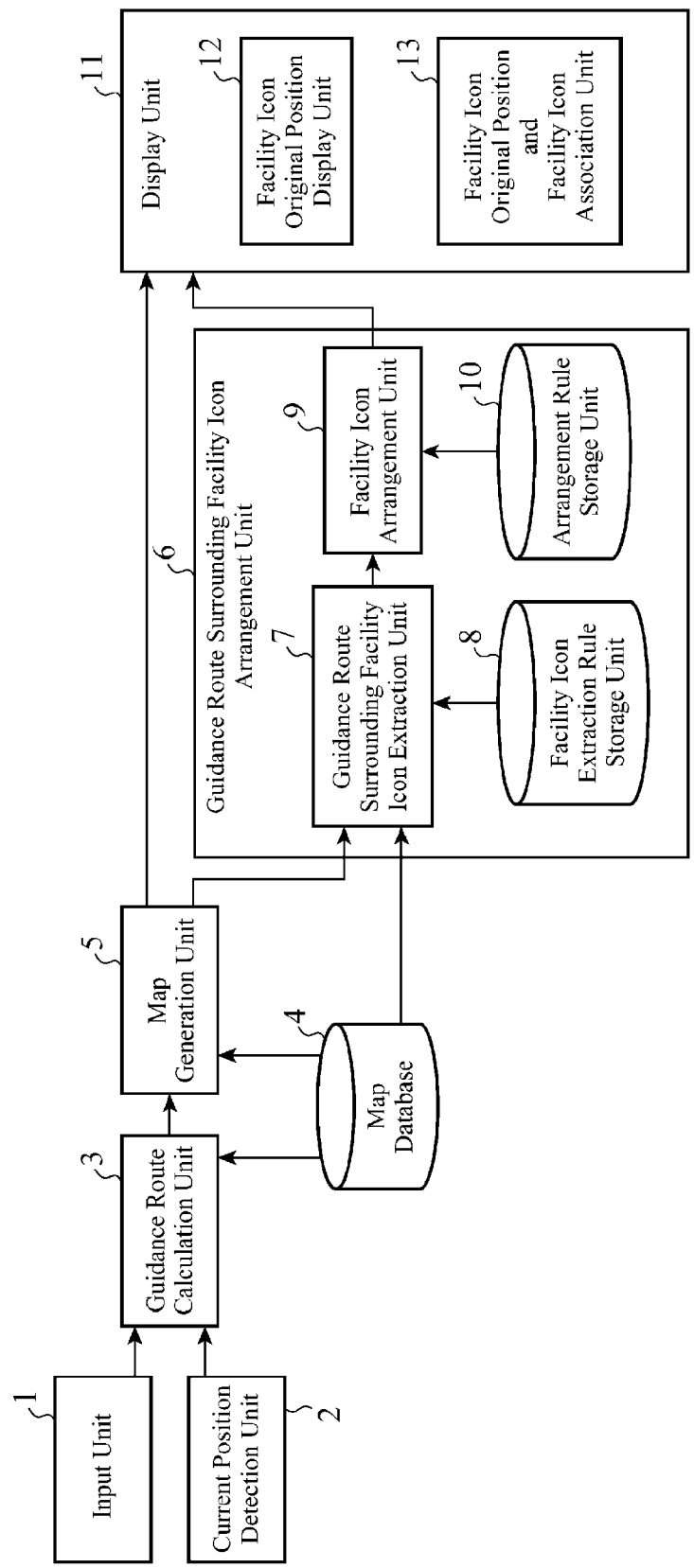
FIG. 1 is a block diagram showing the structure of a navigation device in accordance with Embodiment 1 of the present invention.

FIG. 1 is a block diagram showing the structure of a navigation device according to Embodiment 1 of the present invention. The navigation device is comprised of an input unit 1, a current position detection unit 2, a guidance route calculation unit 3, a map database 4, a map generation unit 5, a guidance route surrounding facility icon arrangement unit 6, and a display unit 11.

The input unit 1 enables a user to input point information about a destination. The current position detection unit 2 detects point information about a current position by using GPS (not shown) or the like. The guidance route calculation unit 3 carries out calculation of a guidance route from the point information about the destination inputted thereto from the input unit 1, and the point information about the current position detected by the current position detection unit 2 by using map information stored in the map database 4. The map database 4 stores the map information in a storage medium, such as a hard disk or a memory. The map generation unit 5 generates a guidance route map by using the guidance route notified thereto from the guidance route calculation unit 3, and the map information stored in the map database 4.

The guidance route surrounding facility icon arrangement unit 6 extracts the icons of facilities which are located around a guidance route to arrange the facility icons, and includes a guidance route surrounding facility icon extraction unit 7, a facility icon extraction rule storage unit 8, a facility icon arrangement unit 9, and an arrangement rule storage unit 10.

The guidance route surrounding facility icon extraction unit 7 extracts the icons of facilities each of which is used as a landmark around the guidance route according to a facility icon extraction rule read from the facility icon extraction rule storage unit 8. Priorities respectively assigned to the facility icons which are extracted are stored in this facility icon extraction rule storage unit 8. The facility icon arrangement unit 9 places each of the icons of facilities which are located around the guidance route at a position which is offset from a position where the facility icon was originally planned to be placed according to an arrangement rule read from the arrangement rule storage unit 10. In this arrangement rule storage unit 10, an offset arrangement rule for arrangement of the icons of facilities which are located around a guidance route for recommending the user to make a right or left turn at an intersection, an offset arrangement rule for arrangement of the icons of facilities which are located around a guidance route for recommending the user to stay on a road without turning off at any intersection, and so on are stored.

Figure 6:
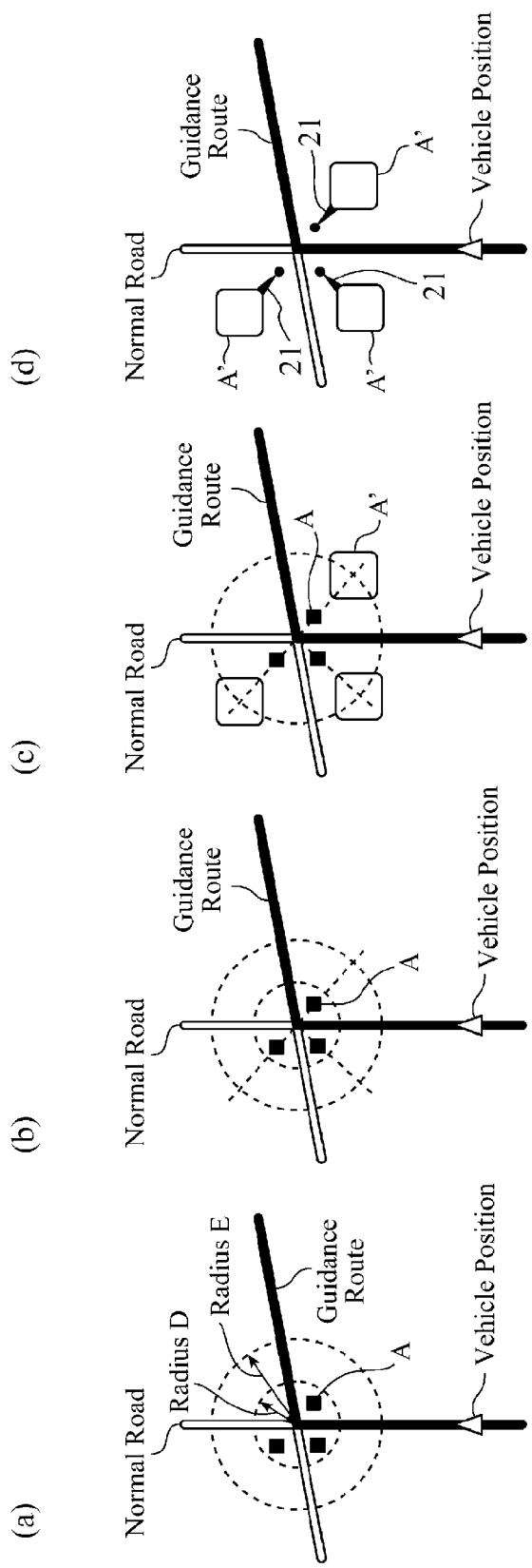
FIG. 6 is an explanatory drawing of an arrangement rule for arrangement of the icons of facilities located around an intersection.

The display unit 11 displays the guidance route map generated by the map generation unit 5 and the icons which are arranged at offset positions by the facility icon arrangement unit 9 on display equipment (not shown) such as a liquid crystal display monitor, and includes a facility icon original position display unit 12, and a facility icon original position and facility icon association unit 13. The facility icon original position display unit 12 displays a mark "□E" at the position where each of the facility icons on the map was originally planned to be placed. The facility icon original position and facility icon association unit 13 establishes associations by connecting each mark "□E" displayed at the position where the corresponding facility icon is originally planned to be placed with this offset facility icon using an arrow-shaped triangle 21 (FIG. 6).

Figure 2:
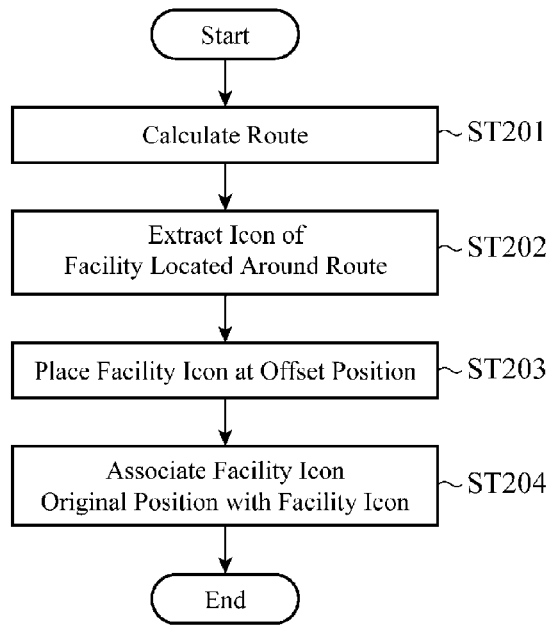
FIG. 2 is a flow chart explaining the operation of the navigation device in accordance with the present Embodiment 1.

FIG. 2 is a flow chart showing the operation of the navigation device having the structure shown in FIG. 1. In step ST201, the guidance route calculation unit 3 calculates a guidance route, and the map generation unit 5 generates a guidance route map by using the calculated guidance route and map information read from the map database 4, and outputs the guidance route map.

In step ST202, the guidance route surrounding facility icon extraction unit 7 receives the guidance route map generated in step ST201, and the map information read from the map database 4, and extracts the icons of facilities each of which is used as a landmark around the guidance route according to a facility icon extraction rule read from the facility icon extraction rule storage unit 8 and outputs the facility icons.

Figure 3:
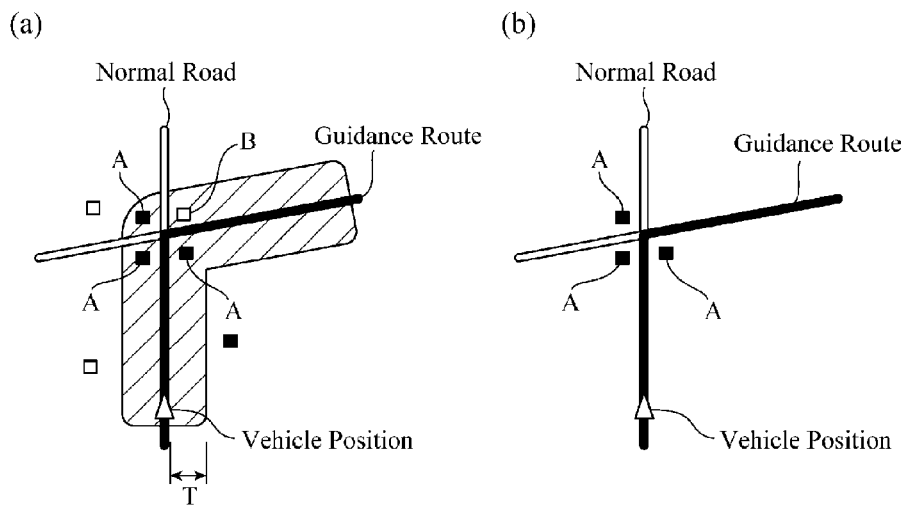
FIG. 3 is an explanatory drawing showing extraction of the icons of facilities located around an intersection.
Figures 4, 5:
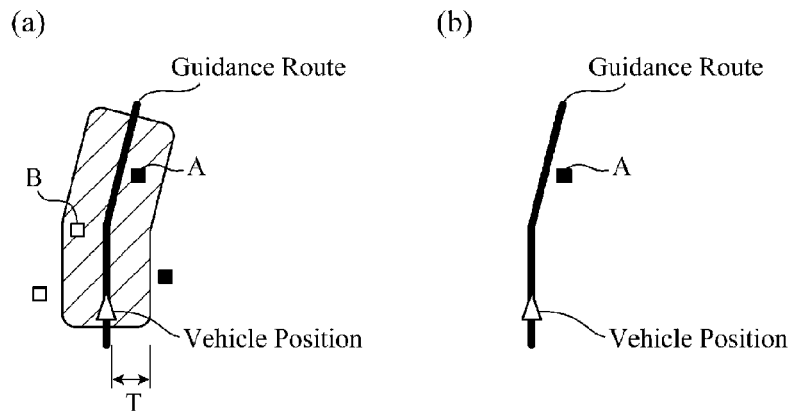
FIG. 4 is an explanatory drawing showing extraction of the icons of facilities located around a guidance route for recommending the user to stay on a road without turning off at any intersection.
FIG. 5 is a data table showing inter-type priorities and intra-type priorities.

Hereafter, facility icon extraction rules will be explained concretely. First, extraction of the icons of facilities which are located around a guidance route for recommending the user to make a right or left turn at an intersection will be explained. As shown in FIG. 3(a), the guidance route surrounding facility icon extraction unit 7 extracts the icons A and B of facilities which are located within a region at a distance T from the guidance route for the first time. The distance T is the one at which only facilities facing the guidance route are included. The guidance route surrounding facility icon extraction unit then extracts only the icon A of the facility to which a priority is assigned, as an icon to be displayed on the display unit 11, on the basis of inter-type priorities as shown in FIG. 5(a) and intra-type priorities as shown in FIG. 5(b). In this Embodiment, the icon B is the one having "no" priority, and is not extracted finally by the guidance route surrounding facility icon extraction unit 7.

Inter-type priorities are assigned to facility icons according to their respective facility icon genres, and are a criterion by which to determine whether or not to extract facility icons, and by which to determine which one of a plurality of facility icons being displayed while overlapping each other should be given a higher priority. The larger numerical value of an inter-type priority has the higher priority, and there is a facility icon genre to which no priority is assigned. These inter-type priorities can be alternatively assigned to facility icons according to their respective name recognition rates. As an alternative, the inter-type priorities can be assigned to facility icons according to their respective degrees of visibility of corresponding stores or signs. As an alternative, the inter-type priorities can be assigned to facility icons according to their respective numbers of corresponding stores.

Further, intra-type priorities are assigned to facility icons belonging the same facility icon genre according to their respective company brand names, and are a criterion by which to determine which one of a plurality of facility icons belonging the same facility icon genre and being displayed while overlapping each other should be given a higher priority. The larger numerical value of an intra-type priority has the higher priority, and there is a company brand name to which no priority is assigned.

These intra-type priorities can be alternatively assigned to facility icons according to their respective name recognition rates. As an alternative, the intra-type priorities can be assigned to facility icons according to their respective degrees of visibility of corresponding stores or signs. As an alternative, the intra-type priorities can be assigned to facility icons according to their respective numbers of corresponding stores. The facility icon B to which no priority is assigned is not extracted. As a result, as shown in FIG. 3(b), the three facility icons A located around the intersection are extracted.

Next, the extraction of the icons of facilities which are located around a guidance route for recommending the user to stay on a road without turning off any intersection will be explained. As shown in FIG. 4(a), the navigation device extracts facility icons A and B located within a region at a distance T from the guidance route first. In this case, the distance T is a distance at which only the facility icons A and B facing the guidance route are included. How to assign priorities to the facility icons A and B to further extract facility icons from these icons is the same as that shown in FIGS. 5(a) and 5(b). The navigation device does not extract the facility icon B to which no priority is assigned finally. As a result, as shown in FIG. 4(b), the only one facility icon A located around the guidance route is extracted.

The facility icon arrangement unit 9, in step ST203, receives the facility icon A located around the guidance route extracted in step ST202, and carries out offset arrangement of the facility icon to place this facility icon as a facility icon A' by using an arrangement rule read from the arrangement rule storage unit 10.

Hereafter, the arrangement rule will be explained concretely. As a method of carrying out offset arrangement of the facility icon A, there can be considered a method of searching for an offset destination in the surroundings centered at the position (facility icon original position) where the facility icon A was originally planned to be placed. A problem with this method is, however, that in the case of carrying out offset arrangement of the icon A of a facility which is located around a guidance route for recommending the user to make a right or left turn at an intersection, it is difficult to carry out the offset arrangement of the facility icon A according to the configuration of the intersection and to place a facility icon A' at an offset position which enables the user to intuitively identify the facility icon original position.

Therefore, the navigation device in accordance with this Embodiment solves this problem by using a method of carrying out offset arrangement of a facility icon A in a radial direction with respect to an intersection at which the navigation device recommends the user to make a right or left turn. First, the arrangement rule for arrangement of the icon A of a facility which is located around a guidance route for recommending the user to make a right or left turn at an intersection will be explained. As shown in FIG. 6(a), each facility icon A located within a circular area having a radius D centered at the intersection is placed as a facility icon A' on the circumference of a circle having a radius E centered at the intersection. The radius D has the same length as the distance T. The radius E is shown by the following inequality:

$$E > D + \frac{1}{\sqrt{2}}l$$

In this equation, l is the length of one side of each large-size facility icon A' placed at a position offset from the facility icon original position. Each large-size facility icon A' placed at the offset position can have a size several times that of each normal facility icon A.

As shown in FIG. 6(b), the navigation device draws a line segment connecting between the center of the intersection and the facility icon original position of each facility icon. As shown in FIG. 6(c), the navigation device places the center of each large-size facility icon A' (a square having sides whose length is l) at a point where the line segment connecting between the center of the intersection and the corresponding facility icon original position crosses the circumference of the circle having the radius E.

Figure 7:
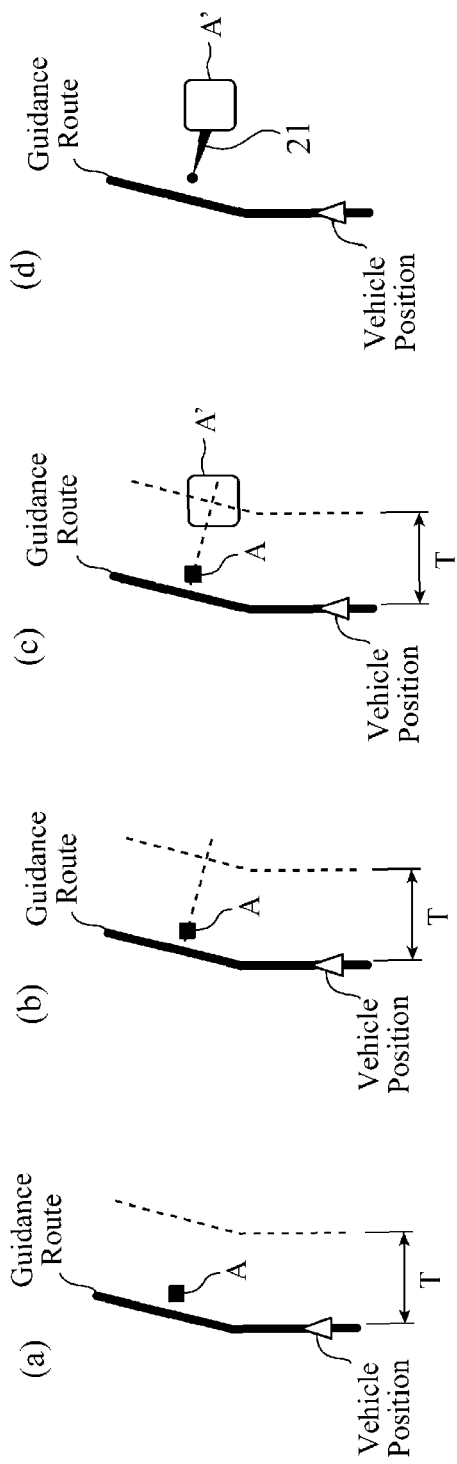
FIG. 7 is an explanatory drawing of an arrangement rule for arrangement of the icons of facilities located around a guidance route for recommending the user to stay on a road without turning off at any intersection.

Next, the arrangement rule for arrangement of the icons of facilities which are located around a guidance route for recommending the user to stay on a road without turning off any intersection will be explained. As shown in FIG. 7(a), the navigation device places a facility icon on a line segment at a distance T from the guidance route. The distance T is shown by the following inequality:

$$T > A + \frac{1}{\sqrt{2}}l$$

As shown in FIG. 7(b), the navigation device draws the normal to the guidance route passing through the facility icon original position of a facility icon. As shown in FIG. 7(c), the navigation device places the center of a large-size facility icon A' (a square having sides whose length is l) at a point where the normal to the guidance route passing through the facility icon original position crosses the line segment at the distance T from the guidance route. The navigation device can discriminate between the icon of a facility which is located around a guidance route for recommending the user to stay on a road without turning off any intersection and the icon of any other facility which is located around a guidance route for recommending the user to make a right or left turn at an intersection by reducing the size of the facility icon to less than that of the other facility icon. The display unit 11, in step ST204, receives each facility icon A' which is placed in step ST203 at the position offset from the corresponding facility icon original position. The facility icon original position and facility icon association unit 13 establishes an association between the original position of each facility icon A and the corresponding facility icon A', and then ends the flow.

More specifically, the facility icon original position and facility icon association unit places "□E" at the facility icon original position, and connects an arrow-shaped triangle 21 between the facility icon original position and the center of each facility icon A' arranged at the offset position, as shown in FIGS. 6(d) and 7(d). By placing "□E" at the facility icon original position, and connecting between the facility icon original position and each facility icon A' with an arrow-shaped triangle, the navigation device enables the user to spontaneously move his or her line of sight from each facility icon A' arranged at the offset position to □E" to easily identify the position where the corresponding facility icon A was originally placed.

As mentioned above, because the navigation device according to Embodiment 1 narrows facility icons A which are located around a guidance route to omit unnecessary facility icons B, there is provided an advantage of arranging and displaying only facility icons A required for guidance, thereby improving the visibility of an on-screen map.

Further, because the navigation device according to Embodiment 1 places a facility icon A at a position offset from its original position to display a facility icon A' in a larger size in such a way that the facility icon does not overlap any other facility icon and does not overlap the guidance route, there is provided an advantage of clearly displaying the facility icon A' required for travel and the guidance route at all times.

In addition, because the navigation device according to Embodiment 1 places "□E" at the facility icon original position where the facility icon A was originally planned to be placed, and connects between "□E" and the facility icon A' placed at the offset position with an arrow-shaped triangle 21 to establish an association between them, there is provided an advantage of enabling the user to intuitively identify the facility icon A' and the original position of the facility icon A.

Embodiment 2

Figure 8:
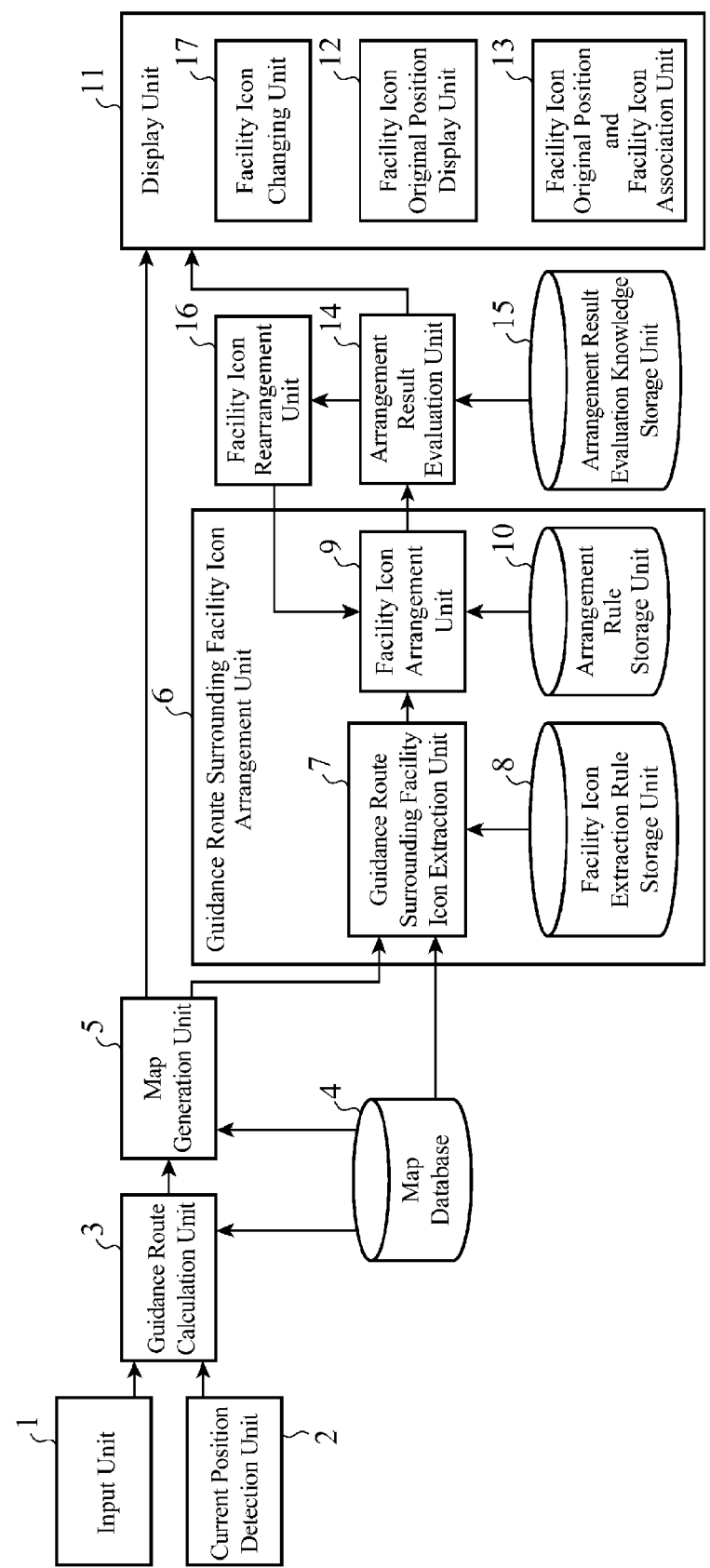
FIG. 8 is a block diagram showing the structure of a navigation device in accordance with Embodiment 2 of the present invention.

FIG. 8 is a block diagram showing an example of a navigation device according to Embodiment 2 of the present invention. Because structural components including from an input unit 1 to an arrangement rule storage unit 10 are the same as those according to Embodiment 1, the same components are designated by the same reference numerals as those shown in the figure explained in Embodiment 1, and a duplication explanation will be omitted hereafter. An arrangement result evaluation unit 14 determines whether or not it is necessary to rearrange a facility icon A' by using arrangement result evaluation knowledge read from an arrangement result evaluation knowledge storage unit 15. When it is necessary to rearrange a facility icon A', a facility icon rearrangement unit 16 rearranges the facility icon A'. A display unit 11 has a facility icon changing unit 17 in addition to the components of the display unit according to Embodiment 1.

Figure 9:
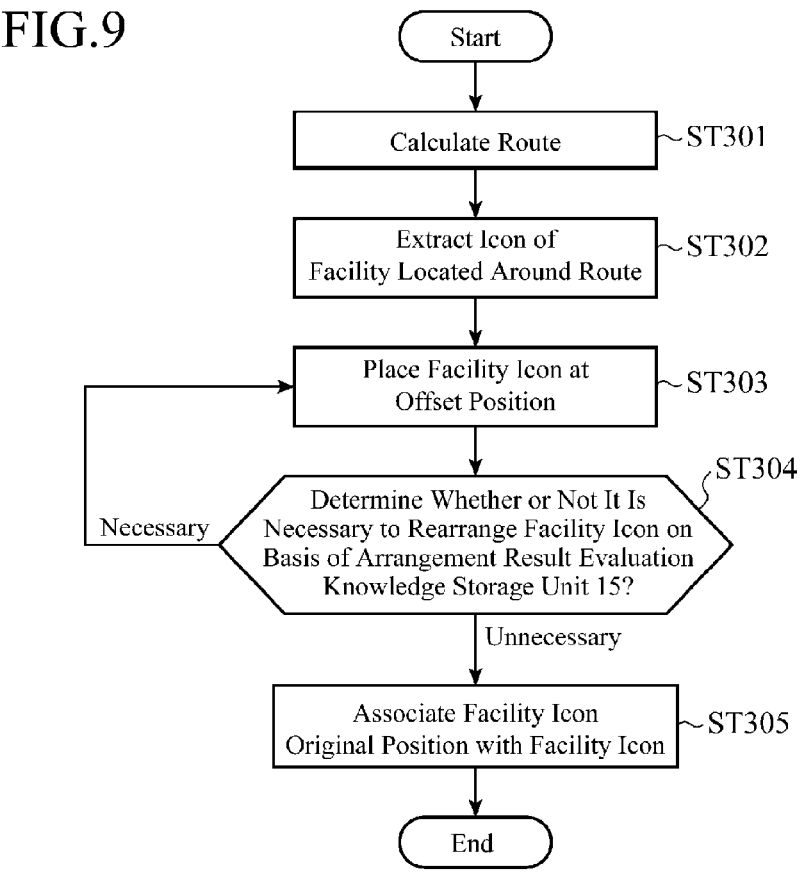
FIG. 9 is a flow chart explaining the operation of the navigation device in accordance with the present Embodiment 2.

FIG. 9 is a flow chart showing the operation of the navigation device having the structure shown in FIG. 8. In this figure, processes in steps ST301 to ST302 are the same as those according to Embodiment 1 shown in FIG. 2. A facility icon arrangement unit 9, in step ST303, receives a facility icon A extracted in step ST302 and located around a guidance route, and carries out offset arrangement on a facility icon A' by using an arrangement rule read from the arrangement rule storage unit 10, and outputs the facility icon A'. The arrangement result evaluation unit 14, in step ST304, receives the facility icon A' on which the offset arrangement has been carried out in step ST303, and determines whether or not it is necessary to rearrange the facility icon A' by using the arrangement result evaluation knowledge read from the arrangement result evaluation knowledge storage unit 15.

Hereafter, the arrangement result evaluation knowledge will be explained concretely. The arrangement result evaluation knowledge is used to determine whether a facility icon A' placed at an offset position overlaps a guidance route and determine whether a plurality of facility icons overlap each other, as shown in FIG. 16. When determining that it is necessary to rearrange the facility icon A' according to this arrangement result evaluation knowledge, the navigation device returns to step ST303 and rearranges the facility icon A' by using the facility icon rearrangement unit 16. In contrast, when determining that it is not necessary to rearrange the facility icon A' according to the arrangement result evaluation knowledge, the navigation device advances to step ST305.

Hereafter, the facility icon rearrangement unit 16 will be explained concretely. When the facility icon A' placed at an offset position overlaps a guidance route, and when the facility icon A' overlaps one or more other facility icons, the facility icon rearrangement unit 16 rearranges the facility icon A' in order to modify the position of this facility icon in such a way that the facility icon does not overlap any other object.

Figure 10:
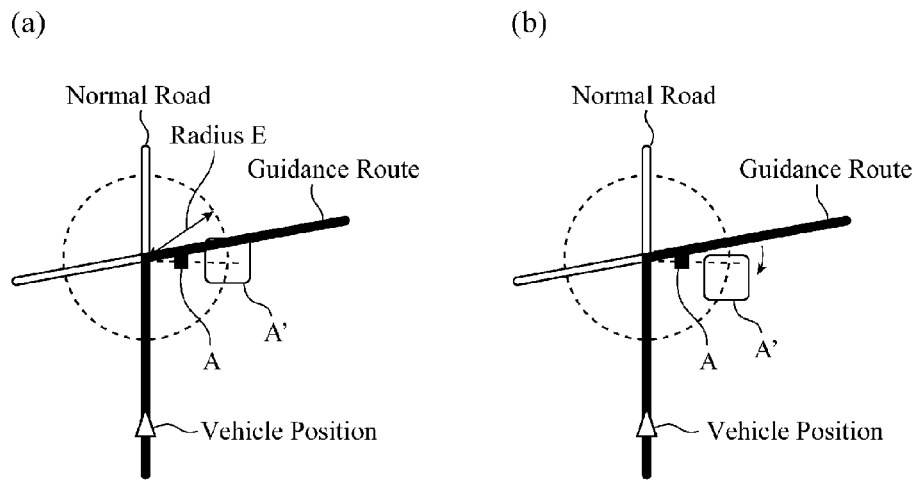
FIG. 10 is an explanatory drawing of an arrangement rule for arrangement of facility icons when a facility icon overlaps a guidance route at an intersection.

First, the operation of the facility icon rearrangement unit 16 when a facility icon A' placed at an offset position overlaps a guidance route will be explained. When a facility icon A' which is placed at an offset position around an intersection at which the navigation device recommends the user to make a right or left turn overlaps a guidance route, as shown in FIG. 10(a), the facility icon rearrangement unit moves the facility icon A' on the circumference of a circle having a radius E centered at the intersection to rearrange the facility icon A' in such a way that this facility icon does not overlap the guidance route, as shown in FIG. 10(b). In this case, the facility icon rearrangement unit moves the facility icon A' in such a way that this facility icon does not straddle the guidance route.

Figure 11:
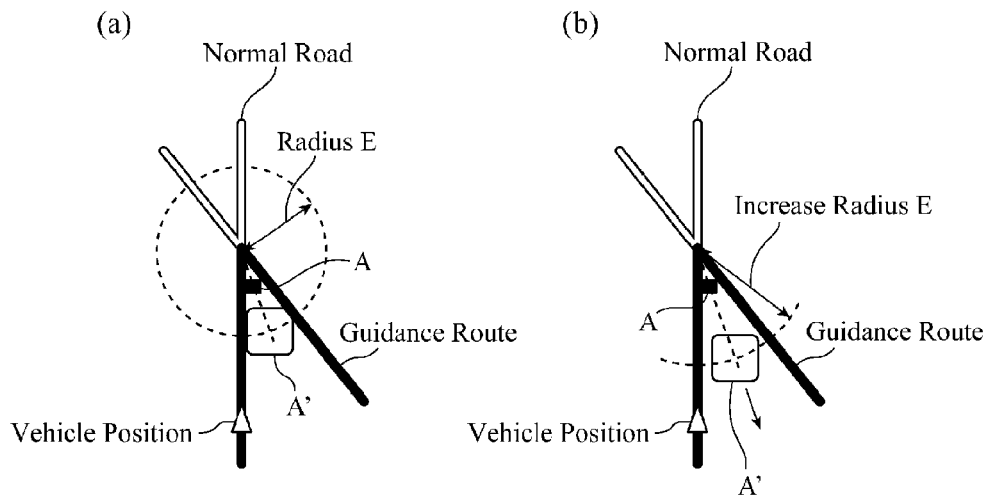
FIG. 11 is an explanatory drawing of another arrangement rule for arrangement of facility icons when a facility icon overlaps a guidance route at an intersection.

When a facility icon A' which is placed at an offset position around an intersection at which the navigation device recommends the user to make a right or left turn, as shown in FIG. 11(a), the facility icon rearrangement unit cannot determine a position where the facility icon A' does not overlap the guidance route even if the facility icon rearrangement unit moves the facility icon A' on the circumference of a circle having a radius E. In such a case, the facility icon rearrangement unit can increase the radius E up to a value which causes the facility icon A' not to overlap the guidance route to rearrange the facility icon A', as shown in FIG. 11(b).

Figure 14:
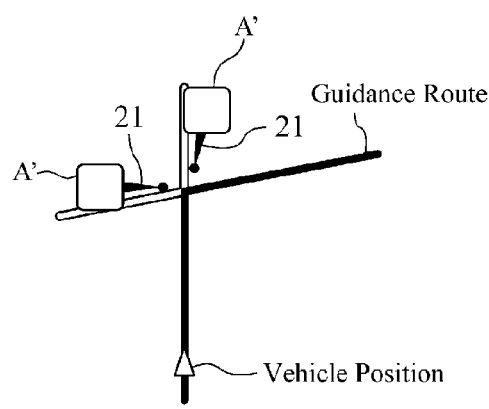
FIG. 14 is a view showing a display when a facility icon overlaps a road other than a guidance route.

Depending on a positional relationship between the facility icon A' and the guidance route, the facility icon rearrangement unit can use these two rearrangement processes together. Further, the facility icon rearrangement unit can carry out a process of disabling the display of a low-priority facility icon A'. When a facility icon A' placed at an offset position overlaps a road other than a guidance route, the facility icon rearrangement unit displays the facility icon A' in a state in which this facility icon overlaps the road, as shown in FIG. 14.

Figure 12:
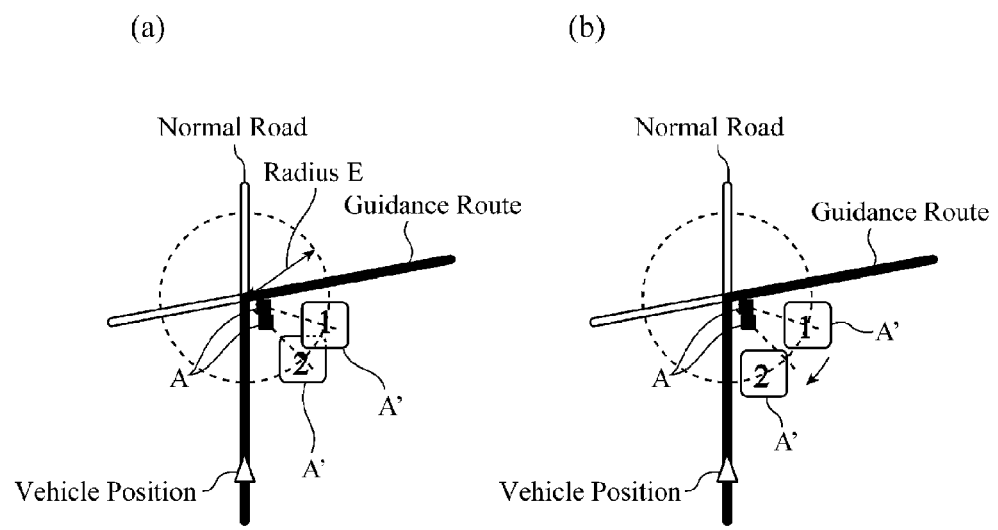
FIG. 12 is an explanatory drawing of an arrangement rule for arrangement of facility icons when facility icons overlap each other at an intersection.

Next, the operation of the facility icon rearrangement unit 16 when a plurality of facility icons overlap each other will be explained. When facility icons A' "1" and "2" which are arranged at offset positions around an intersection at which the navigation device recommends the user to make a right or left turn overlap each other, as shown in FIG. 12(a), the facility icon rearrangement unit moves the lower-priority one "2" of the facility icons A' on the circumference of a circle having a radius E centered at the intersection to rearrange this facility icon in such a way that the facility icons do not overlap each other, as shown FIG. 12(b). A priority assigned to each of the facility icons A' is determined according to inter-type priorities (FIG. 5(a)) and intra-type priorities (FIG. 5(b)). In this case, the facility icon rearrangement unit does not move the facility icon A' "1"

having the highest priority. Further, the facility icon rearrangement unit moves the facility icon A' "2" in such a way that this facility icon does not straddle the guidance route.

Figure 13:
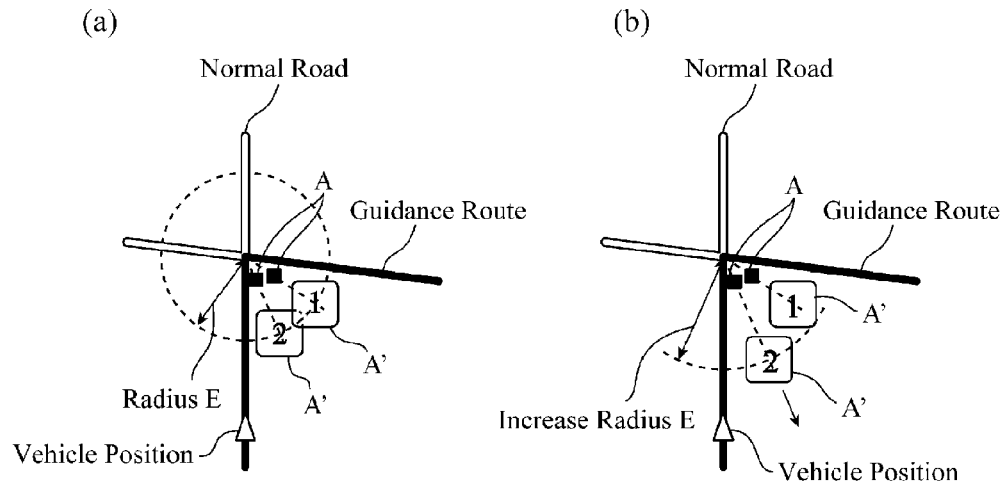
FIG. 13 is an explanatory drawing of another arrangement rule for arrangement of facility icons when facility icons overlap each other at an intersection.

When facility icons A' "1" and "2" which are arranged at offset positions around an intersection at which the navigation device recommends the user to make a right or left turn overlap each other, as shown in FIG. 13(a), the facility icon rearrangement unit cannot determine a position where the facility icon A' "1" does not overlap the other facility icon A' "2" even if the facility icon rearrangement unit moves the lower-priority facility icon A' "2" on the circumference of a circle having a radius E. In such a case, the facility icon rearrangement unit can increase the radius E up to a value which causes the facility icon A' "1" not to overlap the other facility icon A' "2" to rearrange the other facility icon A' "2", as shown in FIG. 13(b). In this case, the facility icon rearrangement unit does not move the facility icon A' "1" having the highest priority. Depending on a positional relationship between the plurality of facility icons A' "1" and "2", the facility icon rearrangement unit can use these two rearrangement processes together. Further, the facility icon rearrangement unit can carry out a process of disabling the display of the lower-priority facility icon A' "2".

Figure 15:
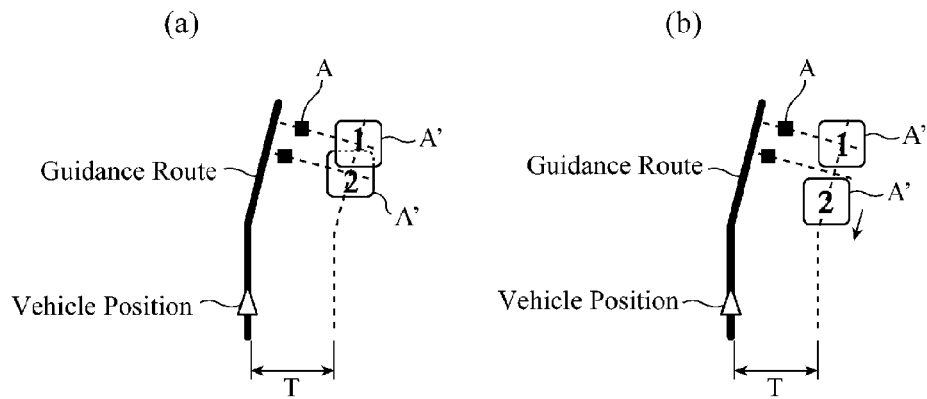
FIG. 15 is an explanatory drawing showing a rule for arrangement of the facility icons of facilities located around a guidance route for recommending the user to stay on a road without turning off at any intersection.

When facility icons A' "1" and "2" which are arranged at offset positions around a guidance route for recommending the user to stay on a road without turning off at any intersection overlap each other, as shown FIG. 15(a), the facility icon rearrangement unit moves the lower-priority facility icon A' "2" on a line segment at a distance T from the guidance route to rearrange this facility icon in such away that the facility icons A' "1" and "2" do not overlap each other, as shown FIG. 15(b). A priority assigned to each of the facility icons A' is determined according to inter-type priorities (FIG. 5(a)) and intra-type priorities (FIG. 5(b)). In this case, the facility icon rearrangement unit does not move the facility icon A' "1" having the highest priority. Further, the facility icon rearrangement unit can carry out a process of disabling the display of the lower-priority facility icon A' "2". A facility icon original position display unit 12 and a facility icon original position and facility icon association unit 13, in step ST305, receive the facility icon A' on which the offset arrangement has been carried out in step ST303, establish an association between the facility icon original position and the facility icon A', and then end the flow shown in the flow chart.

As mentioned above, the navigation device according to Embodiment 2 evaluates the arrangement result acquired by the icon arrangement unit to rearrange a facility icon A' in such a way that the facility icon A' does not overlap a guidance route, and the facility icon A' does not overlap one or more other facility icons. Therefore, the present embodiment provides an advantage of being able to provide a further-arranged, intelligible guidance route map, in addition to the same advantages as those provided by Embodiment 1.

Embodiment 3

Although the example in which the navigation device rearranges a facility icon A' by using the facility icon rearrangement unit 16 is explained in above-mentioned Embodiment 2, a guidance route surrounding facility icon arrangement unit 6 can determine an offset position at which a facility icon A' does not overlap a guidance route and any other facility icon. More specifically, in order to, when moving a facility icon to a position offset from its original position in a radial direction with respect to an intersection at which the navigation device recommends the user to make a right or left turn, prevent a facility icon A' placed at the offset position from overlapping a guidance route, an arrangement rule to determine a distance E from the intersection at which the facility icon A' is placed in such a way that the facility icon A' does not overlap the guidance route is stored in an arrangement rule storage unit 10 in advance. For example, a rule to increase the distance E with decrease in the angle through which the vehicle turns at the intersection at which the navigation device recommends the user to make a right or left turn can be stored in the arrangement rule storage unit. Further, in order to prevent facility icons A' arranged at offset positions from overlapping each other, an arrangement rule to determine the distance E from the intersection for which the offset arrangement of the facility icons is carried out according to the number of facility icons on which the offset arrangement is carried out and the size of each of the facility icons A' arranged at the offset positions is stored in the arrangement rule storage unit 10 in advance. For part of the plurality of facility icons, the distance E from the intersection for which the offset arrangement of the facility icons is carried out can be changed.

As mentioned above, the navigation device according to Embodiment 3 can place a facility icon A' at an offset position in such a way that the facility icon A' does not overlap a guidance route, and can arrange a plurality of facility icons A' at offset positions in such a way that the facility icons A' are displayed while they do not overlap each other, and has an advantage of being able to provide a further-arranged, intelligible guidance route map.

Industrial Applicability

As mentioned above, because the navigation device in accordance with the present invention is constructed in such away as to be able to provide a high-instantaneous-visibility intelligible guidance route map, the navigation device is suitable for use as a navigation device which modifies the arrangement positions of facility icons on a map, thereby improving the visibility of a guidance route, and so on.

EXPLANATIONS OF REFERENCE NUMERALS 1 input unit, 2 current position detection unit, 3 guidance route calculation unit, 4 map database, 5 map generation unit, 6 guidance route surrounding facility icon arrangement unit, 7 guidance route surrounding facility icon extraction unit, 8 facility icon extraction rule storage unit, 9 facility icon arrangement unit, 10 arrangement rule storage unit, 11 display unit, 12 facility icon original position display unit, 13 facility icon original position and facility icon association unit, 14 arrangement result evaluation unit, 15 arrangement result evaluation knowledge storage unit, 16 facility icon rearrangement unit, 17 facility icon changing unit, 21 triangle.

The invention claimed is:
1. A navigation device comprising:
a guidance route calculation unit for calculating a guidance route by using point information about a destination, point information about a current position, and map information;
a guidance map generating unit for generating a guidance route map by using said calculated guidance route and said map information;
a guidance route surrounding facility icon arrangement unit for individually extracting a facility icon of a facility located proximate to said guidance route, and for determining an offset arrangement position of this facility icon with reference to said guidance route; and
a display unit for attaching the facility icon at said determined offset arrangement position on said guidance route map to display the facility icon, wherein said guidance route surrounding facility icon arrangement unit carries out offset arrangement of the facility icon of the facility located proximate to an intersection in a radial direction with respect to a position of the intersection.

2. The navigation device according to claim 1, wherein said guidance route surrounding facility icon arrangement unit determines the offset arrangement position in such a way that said facility icon does not overlap said guidance route and/or any other facility icons.

3. The navigation device according to claim 1, wherein said display unit includes a facility icon original position display unit for displaying a mark showing a facility icon original position at a position where the facility icon on the map was originally planned to be placed.

4. The navigation device according to claim 1, wherein said display unit includes a facility icon original position display unit for displaying a mark showing a facility icon original position at a position where the facility icon on the map was originally planned to be placed, and a facility icon original position mark and facility icon association unit for producing a display which associates the mark with the facility icon.

5. The navigation device according to claim 1, wherein the guidance route surrounding facility icon arrangement device determines an offset position of a facility icon which is further extracted from said facility icons extracted according to predetermined priorities.

6. The navigation device according to claim 1, wherein said guidance route surrounding facility icon arrangement unit carries out offset arrangement of an icon of a facility located around a guidance route for recommending a user to stay on a road without turning off at an intersection, in a direction normal to the guidance route.

7. The navigation device according to claim 1, wherein said display unit changes a size of the facility icon placed at the offset position.

8. The navigation device according to claim 1, further comprising a facility icon rearrangement unit for, when the facility icon placed at the offset position overlaps another facility icon placed at an offset position, moving the facility icons in such a way that the facility icons do not overlap each other.

9. The navigation device according to claim 1, further comprising a facility icon rearrangement unit for, when the facility icon placed at the offset position overlaps another facility icon placed at an offset position, moving a lower-priority one of the facility icons in such a way that the facility icons do not overlap each other.

10. The navigation device according to claim 1, further comprising a facility icon rearrangement unit for, when the facility icon placed at the offset position overlaps the guidance route, moving the facility icon in such a way that the facility icons do not overlap each other.

* * * * *